(12) United States Patent
Koskela et al.

(10) Patent No.: US 9,258,811 B2
(45) Date of Patent: Feb. 9, 2016

(54) SIGNALING METHOD TO ENABLE CONTROLLED TX DEFERRING IN MIXED LICENSE AND UNLICENSED SPECTRUM IN CARRIER AGGREGATION IN FUTURE LTE-A NETWORKS

(71) Applicant: BROADCOM CORPORATION, Irvine, CA (US)

(72) Inventors: Timo Koskela, Oulu (FI); Sami Jukka Hakola, Kempele (FI); Samuli Turtinen, Li (FI); Chunyan Gao, Beijing (CN)

(73) Assignee: BROADCOM CORPORATION, Irvine, CA (US)

( * ) Notice: Subject to any disclaimer, the term of this patent is extended or adjusted under 35 U.S.C. 154(b) by 167 days.

(21) Appl. No.: 13/963,399

(22) Filed: Aug. 9, 2013

(65) Prior Publication Data

US 2014/0036818 A1 Feb. 6, 2014

Related U.S. Application Data

(63) Continuation of application No. PCT/CN2011/070929, filed on Feb. 11, 2011.

(51) Int. Cl.
*H04W 72/04* (2009.01)
*H04W 72/12* (2009.01)

(52) U.S. Cl.
CPC ........ *H04W 72/042* (2013.01); *H04W 72/1231* (2013.01)

(58) Field of Classification Search
CPC .................... H04W 72/042; H04W 72/1231
USPC .......................................... 370/310, 328, 329
See application file for complete search history.

(56) References Cited

U.S. PATENT DOCUMENTS

| | | | | |
|---|---|---|---|---|
| 5,850,596 A | * | 12/1998 | Reynolds | 455/63.1 |
| 8,280,389 B1 | * | 10/2012 | Turtinen et al. | 455/450 |
| 2008/0188224 A1 | * | 8/2008 | Pani et al. | 455/436 |
| 2009/0185599 A1 | * | 7/2009 | Chari | 375/132 |
| 2009/0203320 A1 | * | 8/2009 | Horn et al. | 455/63.1 |
| 2009/0204862 A1 | * | 8/2009 | Chun et al. | 714/748 |

(Continued)

FOREIGN PATENT DOCUMENTS

| WO | WO2010069153 | 6/2010 |
|---|---|---|
| WO | WO2011131119 | 10/2011 |

*Primary Examiner* — Chi H Pham
*Assistant Examiner* — Robert Lopata
(74) *Attorney, Agent, or Firm* — Oblon, McClelland, Maier & Neustadt, L.L.P.

(57) ABSTRACT

The present invention discloses a signaling method, an apparatus and a computer program for controlled transmission signal deferring utilizing both licensed and unlicensed frequency bands for carrier aggregation. In the method, a connection is established between a User Equipment and a base station. For example, based on a sensed interference level, a transmission deferring indication is generated regarding a secondary component carrier locating on an unlicensed band, in case the secondary component carrier is occupied. This indication may be generated and sent either by the base station or by the User Equipment. Finally, the secondary component carrier is deactivated for data transmission, for deferring data transmission for a certain time period. After the deferring time has passed, the data transmission can be re-performed on the same secondary component carrier, or through switching to another secondary component carrier in unlicensed spectrum.

22 Claims, 4 Drawing Sheets

(56) References Cited

U.S. PATENT DOCUMENTS

| | | | |
|---|---|---|---|
| 2010/0091716 A1* | 4/2010 | Bonta et al. | 370/329 |
| 2010/0208681 A1* | 8/2010 | Elmaleh | 370/329 |
| 2010/0240406 A1 | 9/2010 | Tseng | |
| 2010/0246506 A1* | 9/2010 | Krishnaswamy | 370/329 |
| 2011/0028102 A1* | 2/2011 | Li et al. | 455/71 |
| 2011/0205986 A1* | 8/2011 | Medapalli | 370/329 |
| 2012/0063373 A1* | 3/2012 | Chincholi et al. | 370/281 |
| 2012/0129522 A1* | 5/2012 | Kim et al. | 455/434 |
| 2012/0140799 A1* | 6/2012 | Lim et al. | 375/219 |
| 2012/0243638 A1* | 9/2012 | Maltsev et al. | 375/316 |
| 2012/0250631 A1* | 10/2012 | Hakola et al. | 370/329 |
| 2013/0143502 A1* | 6/2013 | Kazmi et al. | 455/62 |
| 2013/0155991 A1* | 6/2013 | Kazmi et al. | 370/329 |
| 2013/0188552 A1* | 7/2013 | Kazmi et al. | 370/315 |
| 2013/0203378 A1* | 8/2013 | Vos et al. | 455/406 |
| 2013/0294356 A1* | 11/2013 | Bala et al. | 370/329 |

\* cited by examiner

SIGNALING METHOD TO ENABLE CONTROLLED TX DEFERRING IN MIXED LICENSE AND UNLICENSED SPECTRUM IN CARRIER AGGREGATION IN FUTURE LTE-A NETWORKS

CLAIM OF PRIORITY

This patent application is a continuation (bypass) application under 35 USC 365(c) of international application PCT/CN2011/070929 (filed on Feb. 11, 2011 and designating the US) and claims benefit thereof under 35 USC 120.

BACKGROUND OF THE INVENTION

1. Field of the Invention

The present invention relates to mobile communication networks, and especially to transmission signal defer controlling e.g. in Long Term Evolution (LTE) networks.

2. Description of the Related Art

The evolution of cellular wireless communication systems has been marked with different generations. $1^{st}$ generation (1G) included analog systems such as AMPS (Advanced Mobile Phone System) and NMT (Nordic Mobile Telephone) cellular phone networks, introduced in the early 1980s. The second generation (2G) introduced digital cellular telephony such as the GSM (Global System for Mobile Communications) standard, introduced in the early 1990s, which was standardized by the European Telecommunication Standards Institute (ETSI). GSM applies Time Division Multiple Access (TDMA) based radio interface. GSM is still the most widespread standard used in mobile communications.

After the 2G networks, $3^{rd}$ Generation Partnership Project (3GPP) has standardized globally applicable system specification for $3^{rd}$ generation mobile communication system. An example of such a system is a Universal Mobile Telecommunications System (UMTS) which applies Wideband Code Division Multiple Access (WCDMA) in its air interface. Original chip rate in WCDMA was specified as 3.84 Mcps and the nominal carrier spacing as 5 MHz. In 3GPP release 5, the concept of High-Speed Downlink Packet Access (HSDPA) has been introduced. It is an enhanced communications protocol in the High-Speed Packet Access family which allows higher data transfer speeds and capacity. With HSPDA, data rates up to 4 Mbps for packet switched data are supported. HSPA+ or "Evolved High-Speed Packet Access" is a subsequent wireless broadband standard, and it was defined in release 7. HSPA+ provides further increase in data rates by using higher order modulation methods (such as 64QAM) and by using multiple antenna techniques such as "multiple-input multiple-output" (MIMO) which means employing several antennas both in the transmitter and the receiver.

In release 8, a concept of Long Term Evolution (3GPP LTE) was introduced. Instead of the earlier WCDMA based radio access technology, Orthogonal Frequency Division Multiplexing (OFDM) is applied in LTE. Also, a dual cell HSDPA (DC-HSDPA) is introduced in release 8 which enables single User Equipment (UE) to receive on two adjacent carriers. Dual cell HSDPA is based on a primary and secondary carriers where the primary carrier provides all downlink physical channels together with channels supporting the uplink data transmission, comprising e.g. a first set of High Speed Physical Downlink Shared Channels (HS-PDSCHs) and High Speed Shared Control Channels (HS-SCCHs). The secondary carrier is responsible for transmitting a second set of HS-PDSCHs and HS-SCCHs. Release 8 allows data rate around 42 Mbps when dual cell functionality is used with 64QAM modulation.

Release 9 combined the dual cell HSDPA with MIMO functionality and also extends the dual cell approach to uplink direction. Furthermore, the used carriers may locate in two separate bands for downlink transmission, providing a dual band HSDPA (DB-HSDPA) operation. Bands can be distant, e.g. dual band configuration no 1 in release 9 is specified to represent downlink bands 925-960 MHz and 2110-2170 MHz. This aspect has great effect on planning the UE's RF parts so that the receiver is able to receive in these two bands simultaneously.

Release 9 has further been developed to a standard named as "LTE Advanced", represented by release 10 and fulfilling all $4^{th}$ generation system requirements. The LTE architecture comprises an Evolved UMTS Radio Access Network, abbreviated by E-UTRAN. Release 10 specifies for HSDPA a use of three or four carriers in the downlink direction. This means the UE can receive on four adjacent carriers each having a 5 MHz band. It will provide even higher data rates; with MIMO this approach makes possible data rates up to 168 Mbps.

Generally, multi-antenna techniques cannot continuously increase the transmission rate because there are constraints on the UE size, complexity and also a cost limit for the number of antennas that can be installed to a single UE. In order to fulfill the performance requirements for the release 10, carrier aggregation (CA) has been proposed to aggregate two or more component carriers for supporting high data rate transmission over a wide bandwidth. The bandwidth may be up to 100 MHz for a single UE unit.

There are two types of carrier aggregation, continuous and non-continuous. In continuous carrier aggregation, available multiple component carriers are adjacent to each other. For instance, five adjacent component carriers having a 20 MHz frequency band each, may be aggregated into a 100 MHz wide aggregated frequency band for LTE Advanced use. Instead of that, non-continuous carrier aggregation is achieved when such component carriers are separated along the frequency band. For instance, two carriers each of 20 MHz may be aggregated so that one carrier lies on a first band and another carrier lies on different band. This results in wider available total bandwidth without the spectrum being contiguous. Regarding UE's complexity and especially the hardware implementation, continuous CA is easier to implement. However, regarding spectrum allocation policies and licensing of different frequency bands to different usage, non-continuous CA gives more practical approach. However, besides multiple RF receiving units for a UE, also different propagation characteristics need to be taken into account for the non-continuous CA schemes. Transmission blocks from different component carriers can be aggregated at either the medium access control (MAC) layer or at the physical layer. In a MAC layer data aggregation, each component carrier has its own transmission configuration parameters in the physical layer and also an independent Hybrid Automatic Repeat Request (HARQ) entity in the MAC layer. However, in a physical layer data aggregation, one HARQ entity is used for all aggregated component carriers and also transmission configuration parameters should be specified for the entire aggregated bandwidth.

Regarding HARQ in more detail, it is a combination of Forward Error Correction (FEC) coding and error detection. Redundant bits are added to the data stream and with an appropriate error correction method, some errors due to radio channel quality can be corrected. However, in case of bad channel quality, typically not all errors can be corrected by this way, and therefore the corrupted packet needs to be retransmitted. Earlier corrupted packet can also be saved in the receiver, and it can be used together with the retransmitted packet in order to create an error-free packet. HARQ message is therefore a message from the base station to the UE regarding a certain carrier, and a corresponding acknowledgement message ACK (or NACK, "non-acknowledgement") is created by the UE when receiving the retransmission successfully (or non-successfully). The HARQ messaging can be used in multicarrier transmission so that when the ACK message is sent by the UE as a response to the HARQ retransmission, the test system can determine which downlink carrier the HARQ message relates to.

Regarding radio frequency bands in general, different frequency bands can be licensed to a certain use, or they can be unlicensed. Unlicensed band is basically a shared spectrum where one needs to accept interference from other unknown systems and sources such as in ISM (industrial, scientific and medical) bands. As licensed band operation has been increasingly utilized, portions of the radio spectrum that remain available have become limited. Thus, operators, service providers, communication device manufacturers, and communication system manufacturers, are all seeking efficient solutions to utilize unlicensed shared bands. Communication on an unlicensed shared band is generally based on sharing an available radio channel between different communication devices. Different communication devices may utilize a common radio access technology (RAT), but it is also possible that different communication devices utilize different RATs. In an unlicensed shared band, channel access can be distributed in a manner, where communication devices can be configured to detect a channel, and utilize a channel reservation scheme known to other communication devices in order to reserve a right to access the channel. In such a distributed channel access, a transmitting communication device (e.g. a UE) and a receiving communication device (e.g. "an evolved Node B" or abbreviated later as "eNB"; a base station in 3G and afterwards) are generally not synchronized to any global reference.

Unlicensed bands are naturally shared spectra where one needs to accept interference originating from other unknown systems and interference sources such like different devices applying ISM bands. If deploying unlicensed spectra e.g. for the LTE Advanced networks through some carrier aggregation method, the system needs extensions to be able to operate in such an environment.

One problem in case of uplink carrier aggregation where one or more carriers are allocated on an unlicensed spectrum, the UE may notice after having received a resource allocation request from the eNB (before usage of those resources i.e. during a 4 ms delay from a resource allocate request on the Physical Downlink Control Channel [PDCCH] to actual usage on Physical Uplink Shared Channel [PUSCH]) that there exists significant interference on those unlicensed spectrum resources. In unlicensed band it may be envisioned that also in the future some kind of "listen-before-talk" procedure is desired, thus requiring the device to defer its transmission on unlicensed spectrum. On the other hand, this causes problems in eNB as it waits for the transmission by the UE with certain specified parameters.

Additionally, the eNB itself may also detect notable interference, or noise level increase on resources on the unlicensed spectrum just before the UE or other transmitting is about to start data transmission according to the order by the eNB.

Therefore, there is a need for an efficient signaling method for enabling controlled deferring for the transmission applying carrier aggregation with both licensed and unlicensed frequency bands.

SUMMARY OF THE INVENTION

According to one aspect of the present invention, it introduces a method for transmission deferring applying carrier aggregation. At first, a connection is established between a User Equipment (UE) and a base station (eNB) utilizing licensed and unlicensed frequency bands. After that, a transmission deferring indication is generated regarding a first component carrier locating on an unlicensed band, in case the first component carrier is occupied. After that step, data transmission on the first component carrier is deactivated according to the transmission deferring indication for deferring the data transmission on the first component carrier.

In an embodiment of the invention, deferred data is transmitted on a second component carrier after a deferring time has passed.

In an embodiment of the invention, the transmission deferring indication is triggered by noticed interference exceeding a predetermined threshold on the first component carrier.

In an embodiment of the invention, the transmission deferring indication is User Equipment specific or component carrier specific.

In an embodiment of the invention, the second component carrier is the same as the first component carrier, the component carrier becoming unoccupied during the deferring time.

In an embodiment of the invention, the transmission deferring indication is sent by the base station (eNB) via Physical Downlink Control Channel (PDCCH).

In an embodiment of the invention, it further comprises starting a timer for a Hybrid Automatic Repeat Request (HARQ) process for uplink data transmission; and in case the base station (eNB) does not schedule a data transmission for the deferred HARQ process before the timer expires; flushing a HARQ buffer; and indicating data transmission as failed.

In an embodiment of the invention, the User Equipment (UE) decides whether the first component carrier locating on an unlicensed band is occupied, by sensing available resources on an uplink transmission.

In an embodiment of the invention, the transmission deferring indication is sent via physical uplink shared channel (PUSCH) of a primary component carrier (PCC) using a licensed frequency band, and the first component carrier is a secondary component carrier (SCC).

In an embodiment of the invention, it further comprises lowering a modulation and coding scheme (MCS) because of the noticed interference in the User Equipment (UE); and including a lowered MCS information in the transmission deferring indication sent to the base station (eNB).

In an embodiment of the invention, it further comprises scheduling deferred data transmission onto other carrier via new Downlink Control Information (DCI) format using the PDCCH.

In an embodiment of the invention, the User Equipment (UE) indicates via Physical Uplink Control Channel (PUCCH) whether the User Equipment (UE) is transmitting on the licensed frequency band.

In an embodiment of the invention, it further comprises marking a component carrier as heavily occupied when recurrent transmission deferring indications have been generated; and scheduling a non-heavily occupied component carrier for the data transmission.

In an embodiment of the invention, it further comprises gathering information regarding the unlicensed frequency bands, comprising used and available resources on the bands, in the base station (eNB).

According to another aspect of the invention, there is provided an apparatus for transmission deferring applying carrier aggregation. The apparatus comprises a processor, which is configured to:
- establish a connection between a User Equipment (UE) and a base station (eNB) utilizing licensed and unlicensed frequency bands;
- generate and send either in downlink or uplink direction a transmission deferring indication regarding a first component carrier locating on an unlicensed band, in case the first component carrier is occupied; and
- deactivate data transmission on the first component carrier, according to the transmission deferring indication for deferring the data transmission on the first component carrier.

In an embodiment of the invention, the processor is configured to send the transmission deferring indication on a primary component carrier (PCC) on the licensed frequency band while the first component carrier is a secondary component carrier (SCC).

In an embodiment of the invention, the apparatus is configured to sense interference on resources on an unlicensed band, and based on that, to trigger the transmission deferring indication.

In an embodiment of the invention, the transmission deferring indication covers the uplink data transmission by the User Equipment (UE).

In an embodiment of the invention, the transmission deferring indication covers all resources on the unlicensed spectrum or resources on the first component carrier only.

In an embodiment of the invention, the processor is configured to transmit the deferred data either on a second component carrier or on the first component carrier, depending on the occupying condition of resources on the first component carrier.

In an embodiment of the invention, the apparatus is implemented in the base station (eNB), and further, the processor is configured to send the transmission deferring indication via Physical Downlink Control Channel (PDCCH).

In an embodiment of the invention, the apparatus is implemented in the User Equipment (UE), and further, the processor is configured to send the transmission deferring indication via physical uplink shared channel (PUSCH) of a primary component carrier using a licensed frequency band.

According to another aspect of the invention, there is provided a computer program comprising code adapted to perform the following steps, when executed on a data-processing system:
- establishing a connection between a User Equipment (UE) and a base station (eNB) utilizing licensed and unlicensed frequency bands;
- generating a transmission deferring indication regarding a first component carrier locating on an unlicensed band, in case the first component carrier is occupied; and
- deactivating data transmission on the first component carrier according to the transmission deferring indication for deferring the data transmission on the first component carrier.

In an embodiment, the computer program is stored on a computer readable medium.

It is possible to combine one or more of the embodiments and aspects disclosed above to form one or more further embodiments of the present invention.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. The examples shown in the drawings are not the only possible embodiments of the invention and the invention is not considered to be limited to the presented embodiments. In the drawings.

DETAILED DESCRIPTION OF THE EMBODIMENTS

Reference will now be made in detail to the embodiments of the present invention, examples of which are illustrated in the accompanying drawings.

The present invention introduces a method, an apparatus and a computer program for deferring transmission of signals in a network which applies carrier aggregation.

In general, frequency bands available for the communication between a terminal and a base station are either licensed specifically for given use or service provider (such as for 4G mobile communication use) or the bands are unlicensed. Unlicensed bands (or license-free spectrum as it is sometimes called) means a frequency band that has rules pre-defined for both the hardware and deployment methods of the radio in such a manner that interference is mitigated by the technical rules defined for the bands, rather than the band being restricted for use by only one entity through a spectrum licensing approach.

In the following, it is assumed that a base station (such as an eNB) controls and allocates resources both in licensed and unlicensed spectrum via carrier aggregation methods according to different embodiments of the invention. In an embodiment of the invention, this means that there is a primary component carrier (PCC) taking place on licensed spectrum and additional secondary component carriers (SCCs) taking place on licensed and/or unlicensed spectrum.

In other words, LTE Advanced system concept (from 3GPP release 10 onwards) can deploy the unlicensed bands e.g. via carrier aggregation methods, so thus, the devices and local access points have potential spectrum available to be used in opportunistic manner. This can be implemented as non-contiguous carrier aggregation controlled by the eNB in which unlicensed spectrum is used as a ground for secondary carriers or cells while the primary carriers or cells are using the licensed spectrum.

Figure 1:
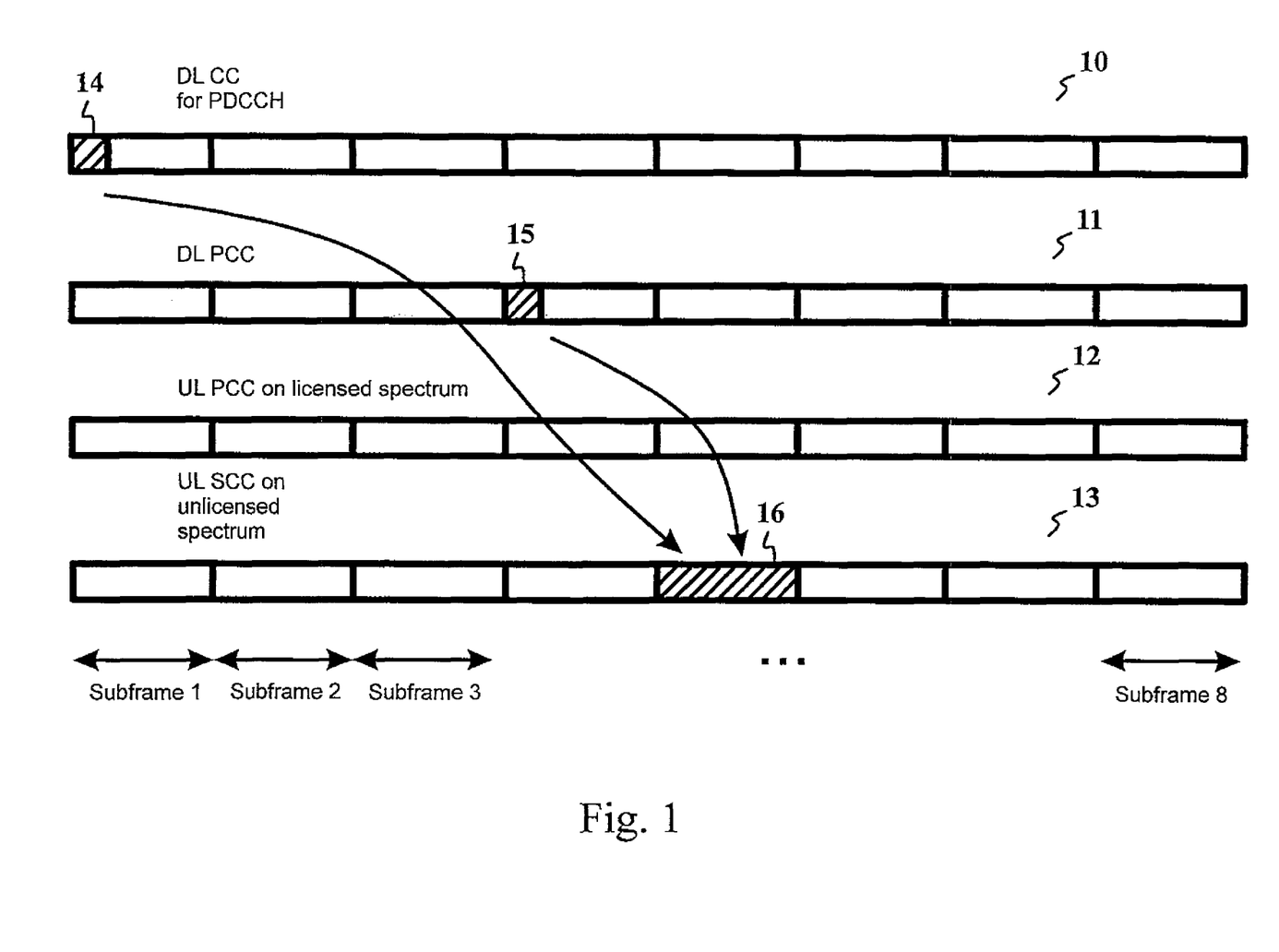
FIG. 1 illustrates an example of downlink signaling to the User Equipment (UE) for deferring transmission on a shared frequency band.

In a first main embodiment of the invention, FIG. 1 shows an exemplary signaling diagram where the horizontal direction represents the time axis with consecutive subframes (in this example, eight subframes have been shown). In the figure, the first and uppermost strip 10 represents control data transmission on the component carrier in downlink direction via Physical Downlink Control Channel (PDCCH). The second strip 11 represents the downlink data transmission on primary component carrier (PCC). The third strip 12 illustrates the uplink data transmission on primary component carrier on the licensed spectrum. The fourth and lowermost strip 13 represents on the other hand uplink data transmission on the secondary component carrier (SCC) and this carrier lies on unlicensed spectrum.

At first, an uplink resource allocation for an UE is made via dedicated search space on PDCCH. This is marked as a transmitted section 14 in the control channel's data transmission 10. The eNB is configured to sense interference on an allocated SCC resource on unlicensed spectrum. If the eNB detects notable interference on the resources on unlicensed spectrum prior to a scheduled uplink transmission by an UE(s) or other device(s), it signals to the UE (or other device) an indication via PDCCH to defer the transmission on those resources (certain unlicensed band component carrier [CC]). This is marked by a section 15 in the beginning of the fourth subframe in the second data transmission strip 11. Depending on the number of CCs used on unlicensed spectrum, needed resolution for the deferring signaling varies. If the deferring signaling 15 consists of only one bit, it may then consider all resources on unlicensed spectrum. In case of several bits for the deferring signaling 15, the deferring may be performed per component carrier basis. Therefore, the amount of information in the deferring signaling 15 can vary from one bit to several bits. Signaling for deferring the transmission can thus be UE specific or component carrier specific. The CC specific means that a single deferring signaling can be targeted to the scheduled radio resources of all devices (UEs) which locate on the specific component carrier on unlicensed spectrum. Having the deferring signaling as CC specific would make more sense as the eNB is the common reception point for each transmitter on uplink and thus, it would be enough and more efficient, to specify a common transmission deferring signaling per component carrier (or common to all CCs on unlicensed spectrum). In the common signaling option, the PDCCH common search space on licensed spectrum could be utilized, as all UEs or other devices need to monitor common search space on the same component carrier (such as primary component carrier). It could be specified that when the UE/device receives an uplink grant for the component carrier on unlicensed spectrum, it shall monitor a certain Radio Network Temporary Identity ("RNTI", given via Radio Resource Control [RRC] to all devices, concerning scheduled unlicensed spectrum resources) on PDCCH on primary component carrier. For delivering deferring message to the User Equipments, a new DCI (Downlink Control Information) format can be defined to carry out either 1-bit information to defer all scheduled unlicensed spectrum transmission in a certain subframe, or n-bit information to defer certain scheduled component carrier(s) (CC) among "n" component carriers on unlicensed spectrum in a certain subframe.

Actual deferred data transmission in uplink direction from the UE to the eNB and using the secondary CC in unlicensed spectrum, is marked by the transmitted section 16 in the fifth subframe of 13. This is merely an exemplary manner of specifying the length of the deferring.

In UE specific deferring signaling, a new DCI format for stopping the transmission in a certain upcoming scheduled subframe on certain CC in unlicensed spectrum can be sent on DL CC where PDCCH has been used for granting these resources to the UE.

Deferring signaling by the eNB brings out uncertainty about length of the transmission restriction on the CC in question which has an effect on how the deferred UE or device shall handle its on-going HARQ process which was prepared for the transmission but eventually deferred by the eNB.

Figure 2:
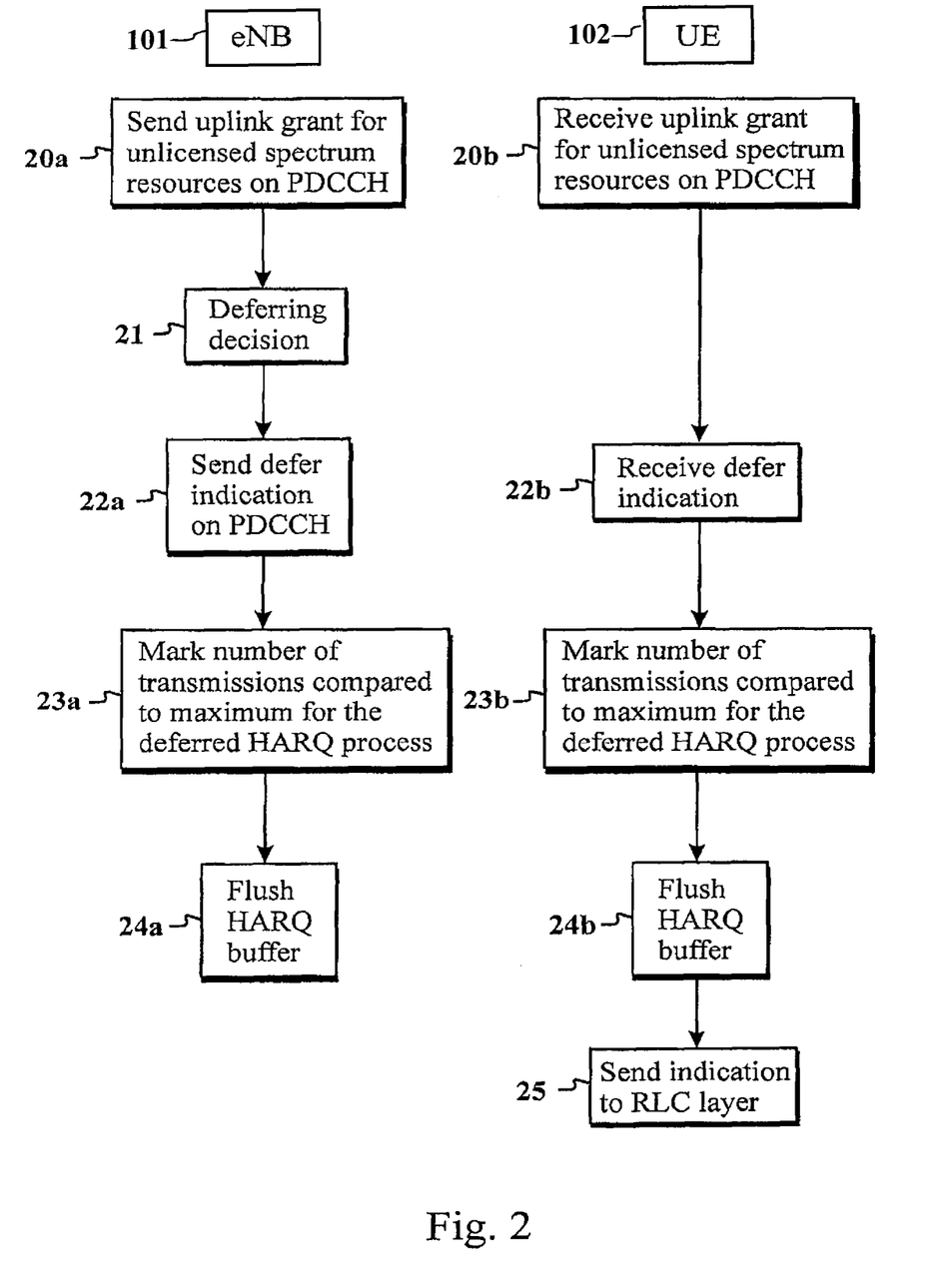
FIG. 2 illustrates side operations by an eNB and UE for a first embodiment of the invention.

Therefore, in an embodiment of the invention, following UE/device and eNB side operations are performed. There are two different exemplary options which are disclosed in the following. A first option is illustrated in FIG. 2.

Operations performed by the base station (eNB) 101 and the UE 102 are considered by mutually corresponding steps. At first, uplink grant is sent by the eNB for unlicensed spectrum resources on PDCCH 20a. The uplink grant is then correspondingly received at the UE 20b. After this, the deferring decision is made by the eNB 21, and a defer indication is sent on PDCCH by the eNB 22a. This indication is correspondingly received by the UE 22b. Deferred HARQ transmission is considered as a failed and last transmission attempt, i.e. maximum number of transmissions has been reached without success. The component carrier for which the deferring indication was sent is then considered deactivated by the eNB.

Furthermore, the UE will mark the HARQ process until the maximum number of retransmissions is reached 23b and it then flushes the HARQ buffer 24b. Thereafter, the UE indicates higher layers about the failure by sending an indication to the Radio Link Control (RLC) layer 25. Component carrier for which the deferring indication is received is then considered implicitly deactivated.

Figure 3:
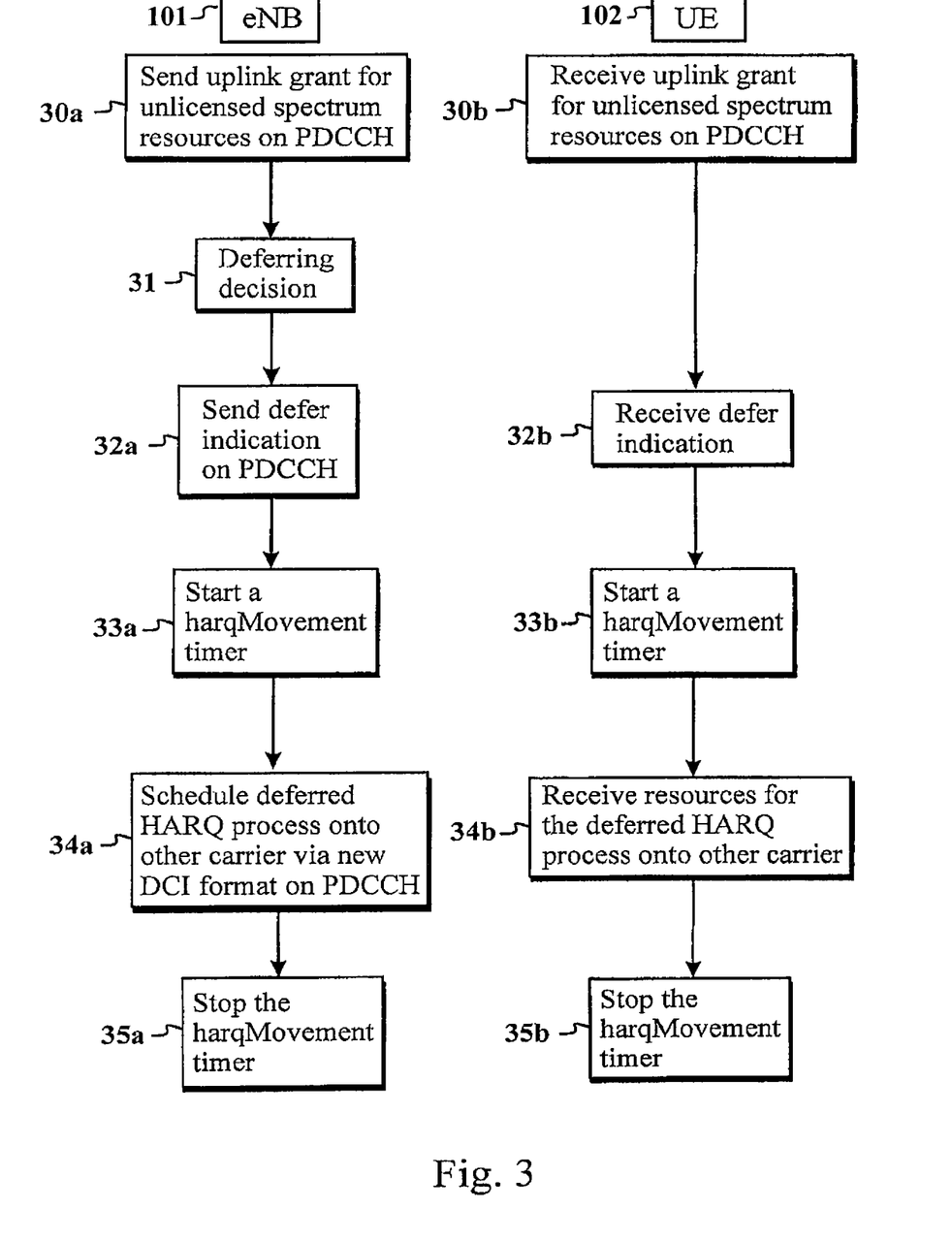
FIG. 3 illustrates side operations by an eNB and UE for a second embodiment of the invention.

A second option for the side operation is illustrated in FIG. 3. Similarly like in FIG. 2, first three steps 30-32 are the same as steps 20-22, in other words, uplink grant is sent by the eNB for unlicensed spectrum resources on PDCCH 30a. The uplink grant is then correspondingly received at the UE 30b. After this, the deferring decision is made by the eNB 31, and a defer indication is sent on PDCCH by the eNB 32a. This indication is correspondingly received by the UE 32b.

After this, a timer called "harqMovement" is started 33a in the eNB. Number of transmissions of the deferred HARQ process is remained in the eNB. The transmission/retransmission of the HARQ process is scheduled 34a onto other carrier via DCI message in which new or modified fields are used to indicate the transfer of the certain HARQ process from one component carrier to another. If the eNB doesn't schedule the transmission or retransmission of the deferred HARQ process before the timer "harqMovement" expires, the HARQ buffer is flushed and the transmission is consired as failed. Component carrier for which the deferring indication was sent is considered deactivated by the eNB.

Regarding operations by the UE or other corresponding device, upon receiving the deferring command for the certain scheduled HARQ process, the UE starts the timer "harqMovement" 33b which is signaled via RRC. The UE then receives resources for the deferred HARQ process onto other component carrier 34b. If the UE doesn't receive a scheduling grant for that HARQ process, it will mark the HARQ process with maximum number of retransmission reached, and then the UE flushes the HARQ buffer, and indicates higher layers about the failure by sending an indication to the RLC layer. Component carrier for which the deferring indication was received is considered implicitly deactivated. The "harqMovement" timer is thus stopped 35b.

Furthermore, in one embodiment of the invention, the procedure comprises a late defer signaling by the eNB, which is suitable e.g. for future LTE time division duplex (TDD) systems. In such a signaling, the eNB can send the deferring indication incorporated also after the UE or device has performed a scheduled HARQ transmission on unlicensed spectrum if the eNB has detected significant interference and decided e.g. not to even try to decode the packet due to a low SINR level. The deferring indication could be conveyed as a new piece of information incorporated into the retransmission of the scheduling grant on PDCCH corresponding to the transmission by the UE or device. Upon receiving such a late deferring indication, the UE or device shall act as described above, according to either the first or second option.

In addition, the procedures as described above can be also used as a fast deactivation method of the uplink component carrier together with a fast re-activation by a new scheduling grant later. This can be adapted to the interference change in an unlicensed band faster than the previous MAC based activation or deactivation method.

In another embodiment, concerning the decision making of deferring transmission at the UE's side, upon receiving the uplink carrier aggregation allocation, which includes allocation for the licensed band resources and unlicensed band resources, the UE shall sense the UL resources on unlicensed band during the UL transmission preparation time after receiving the allocation in downlink DCI message (4 subframes in an example).

- Sensing, including sensing resolution (sensing bandwidth) and duration (sensing length) on unlicensed band is configured by the network.
- Interference threshold is configured by the network (in local communication, the eNB and UE may experience quite similar interference).
- During the 4 subframes' preparation time, the UE decides based on the network's configuration parameters whether the unlicensed band is occupied.

In case the channel is not occupied, the UE proceeds with carrier aggregation transmission on allocated resources.

In case the channel is occupied, the UE shall defer the transmission on unlicensed band and inform the eNB about the deferred transmission with control signaling mapped to the PUSCH on licensed band uplink transmission.

- The deferred transmission is indicated in the multiplexed control signaling on PUSCH on the primary carrier. This field is always present (if configured) when the SCC is allocated on the unlicensed band and this field is transmitted on one of the licensed band component carriers.
- By knowing about deferred transmission, the eNB can react accordingly and it doesn't need to prepare e.g. HARQ ACK/NACK message on downlink or HARQ buffer processing allocated for the unlicensed band transmission.
- Additionally, the UE or device could lower a given modulation and coding scheme (MCS) by the eNB due to the noticed interference and include information about the lowered MCS into the indication signaling sent to the eNB.

Furthermore, the UE initiated deferring signaling can be configurable based on the UE capability and eNB's internal decision, whether to activate the feature e.g. for getting more accurate interference information, when operating on the unlicensed spectrum.

In an embodiment, considering actions by the UE, one implementation option is to define a new control element onto primary carrier PUSCH or onto certain allocated secondary carrier PUSCH, in case no primary carrier PUSCH is allocated to the UE (e.g. on the first allocated carrier index on the PUSCH), that is always present to indicate whether the UE is transmitting on the allocated carrier(s) on unlicensed band. This can be achieved by conveying only 1-bit information by the control element, in this embodiment. Furthermore, the control element could also carry more bits e.g. to inform which unlicensed spectrum carriers are not used in this transmission time interval (TTI). Thus, a larger control element is then needed. A problematic issue in this approach is the current requirement of four TTIs needed for UE's or other device's uplink signal generation, which practically means that the decision to defer the transmission on certain component carrier on unlicensed band should be done at the time the UE/device receives grant for the transmission or earlier. This option could still be usable if there is continuous interference present which is not detected earlier (also earlier channel quality indicator [CQI] reports or sensing results experience at least a 4 ms delay due to the processing requirements by the UE/device) or bursty interference with burst length greater than 4 ms.

In case no component carrier resource is scheduled to the UE simultaneously with the scheduled resources on unlicensed spectrum, additional signaling mechanism is needed in uplink for aforementioned purpose to indicate the eNB about transmission status on those resources. One implementation option is having a certain PUCCH (Physical Uplink Control Channel) resource in licensed spectrum (certain licensed carrier, e.g. implicitly mapped from unlicensed spectrum resource allocation and the knowledge that no licensed spectrum carrier is scheduled simultaneously with it) for indicating the eNB, whether the UE is transmitting or not on the licensed spectrum. In that case, additional PUCCH resource is needed on the licensed spectrum.

In a further embodiment, another implementation option is to re-interpret the existing control information multiplexed to PUSCH in the presence of secondary component carrier on unlicensed band.

Figure 4:
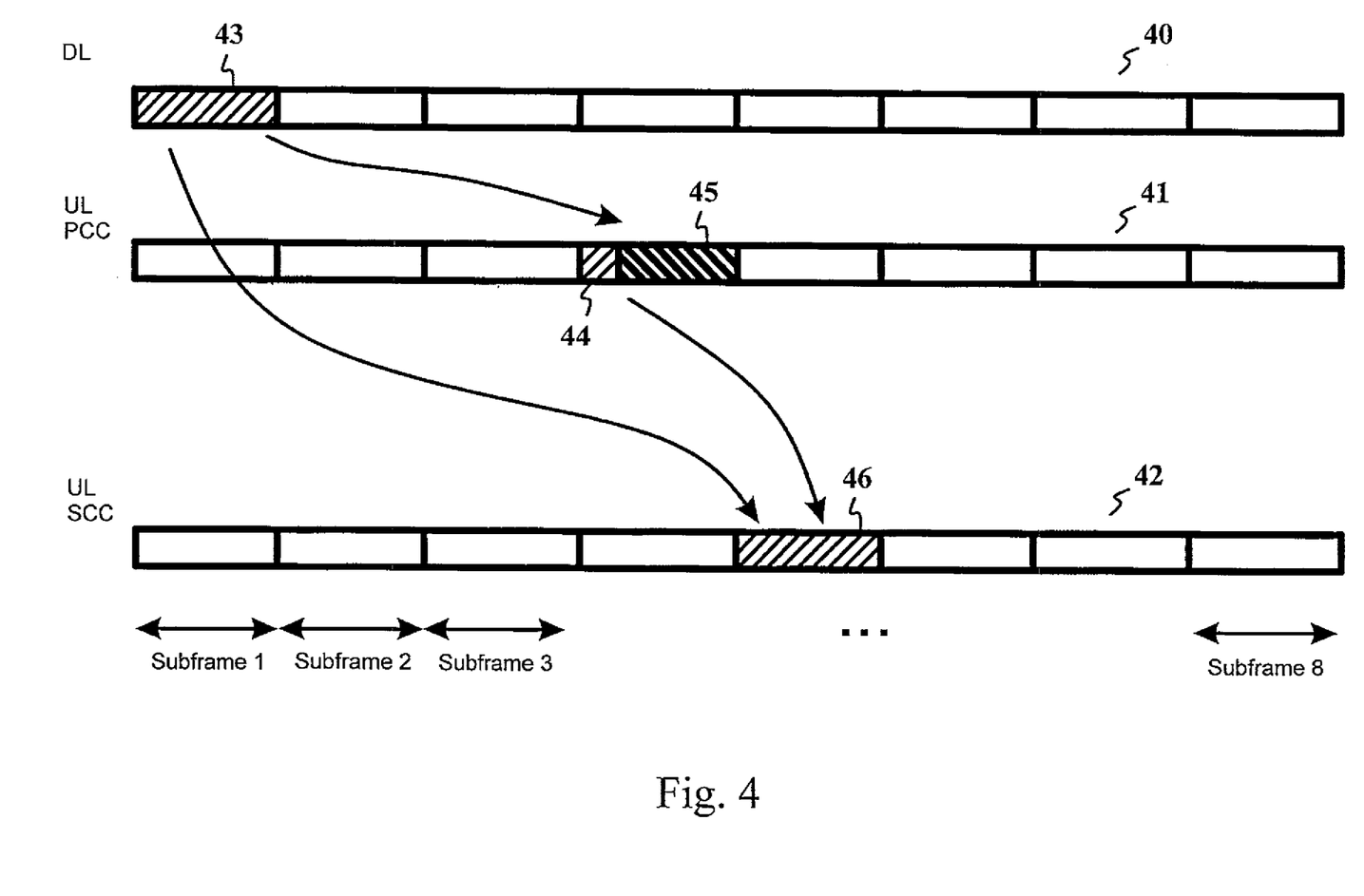
FIG. 4 illustrates an example of the UE side indication of the deferred transmission on an extension carrier.

FIG. 4 illustrates an example regarding a principle of the UE side indication of the deferred transmission on an extension carrier, with a new field in the PUSCH control information part. FIG. 4 is shown as a signaling diagram where the horizontal direction represents the time axis with consecutive subframes (in this example, eight subframes have been shown) as was the case in FIG. 1. In FIG. 4, the first and uppermost strip 40 represents downlink data transmission (DL). The second strip 41 represents the uplink data transmission on primary component carrier (UL PCC). The third and lowermost strip 42 illustrates the uplink data transmission on secondary component carrier.

The first marked subframe 43 in the downlink data transmission means an uplink resource allocation for a UE. After the resource allocation subframe (after two subframes in this example), the UE signals an indication to the eNB of the deferred transmission on secondary component carrier, using a new field in the PUSCH control information part 44. The data transmission using the primary component carrier is made at the fourth subframe of the example, marked by 45. As a consequence of the uplink resource allocation for the UE at hand, and the defer indication in the physical uplink shared channel (PUSCH), the actual deferred data transmission on extension carrier (secondary component carrier) is shown as 46. In this example, it is transmitted one subframe after the data transmission on a primary component carrier. The length of the deferring can however be controlled as described earlier in this description.

In an embodiment, cognitive features can additionally be implemented based on the UE reporting. If certain spectrum resources are heavily used (indicated by recurrent transmission deferring), the eNB can avoid scheduling those frequencies by keeping track of the deferring percentages and frequencies. In some sections of the spectrum, there might be transmission activity on-going periodically, and together with some cognition, those resources can be avoided.

An advantage of the present invention is that it is an effective method against undeterministic interference on unlicensed spectrum for e.g. LTE networks. Additionally, the method can co-exist with other radio access technologies (e.g. technologies standardized by the IEEE) for LTE. A further advantage is that the transmission is deferred if the extension carrier's resources on unlicensed spectrum are occupied, and this is indicated to the eNB with minimal overhead. Furthermore, detection of any non-existent transmission and feedback thereof can be avoided. As a further advantage, cognitive features can be implemented by using the reporting scheme of the invention. Finally, the eNB can gather information about the unlicensed band(s) and the resources with high occupancy/interference ratio.

The present invention is applicable to all 3GPP releases from release 10 onwards. It can therefore be applied to any currently used and future releases supporting the mixed use of licensed and unlicensed bands in carrier aggregation. The invention is also applicable to any other technologies which apply the use of licensed and unlicensed bands in their carrier aggregation processes.

In an embodiment, the method steps, apparatuses (eNBs and UEs) and the computer program according to the invention can be implemented by at least one separate or embedded hardware module for an existing mobile communication system.

A separate or an embedded control unit may perform the above mentioned method steps where applicable. In an embodiment, the apparatus comprises a memory, and at least one processor configured to execute applicable method steps according to the invention. Furthermore, the method according to the invention can be implemented with one or several computer programs which are executed in the at least one processor. The computer program(s) can be stored on at least one computer readable medium such as, for example, a memory circuit, memory card, magnetic or optic disk. Some functional entities may be implemented as program modules linked to another functional entity. The functional entities may also be stored in separate memories and executed by separate processors, which communicate, for example, via a message bus or an internal network within the network node. An example of such a message bus is the Peripheral Component Interconnect (PCI) bus.

The exemplary embodiments of the invention can be included within any suitable device, for example, including any suitable servers, workstations, PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (for instance, voice, modem, and the like), wireless communications media, one or more wireless communications networks, cellular communications networks, 3G communications networks, 4G communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware arts. For example, the functionality of one or more of the components of the exemplary embodiments can be implemented via one or more hardware devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present invention. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of application-specific integrated circuits or by interconnecting an appropriate network of conventional component circuits, as will be appreciated by those skilled in the electrical arts.

As stated above, the components of the exemplary embodiments can include computer readable medium or memories according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Nonvolatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present invention are not so limited, but rather cover various modifications, and equivalent arrangements, which fall within the purview of prospective claims.

It is obvious to a person skilled in the art that with the advancement of technology, the basic idea of the invention may be implemented in various ways. The invention and its embodiments are thus not limited to the examples described above; instead they may vary within the scope of the claims.

What is claimed is:

1. A method, comprising:
    establishing a connection between a User Equipment (UE) and a base station (eNB) utilizing licensed and unlicensed frequency bands;
    generating a transmission deferring indication regarding an allocated first component carrier located on an unlicensed band, when interference is detected on the first component carrier; and
    deactivating data transmission on the first component carrier for a predetermined number of subframes without terminating the allocation of the first component carrier according to the transmission deferring indication for deferring the data transmission on the first component carrier.

2. The method according to claim 1, further comprising:
    transmitting deferred data on the first component carrier or a different component carrier after a deferring time has passed.

3. The method according to claim 1, wherein the transmission deferring indication is triggered by detected interference exceeding a predetermined threshold on the first component carrier.

4. The method according to claim 1, wherein the transmission deferring indication is User Equipment specific or component carrier specific.

5. The method according to claim 2, wherein the deferred data is transmitted on the first component carrier when the interference is reduced on the first component carrier during the deferring time.

6. The method according to claim 1, wherein the transmission deferring indication is sent by the base station (eNB) via a Physical Downlink Control Channel (PDCCH).

7. The method according to claim 1, further comprising:
starting a timer for a Hybrid Automatic Repeat Request (HARQ) process for uplink data transmission after receiving the transmission deferring indication, and when the base station (eNB) does not schedule a data transmission for the deferred data before the timer expires:
flushing a HARQ buffer; and
indicating data transmission as failed.

8. The method according to claim 1, wherein the User Equipment (UE) decides whether the first component carrier locating on an unlicensed band is occupied, by sensing available resources on an uplink transmission.

9. The method according to claim 8, wherein the transmission deferring indication is sent via a physical uplink shared channel (PUSCH) of a primary component carrier (PCC) using a licensed frequency band, and where the first component carrier is a secondary component carrier (SCC).

10. The method according to claim 3, further comprising:
lowering a modulation and coding scheme (MCS) because of the detected interference in the User Equipment (UE); and
including a lowered MCS information in a transmission deferring indication sent to the base station (eNB).

11. The method according to claim 2, further comprising:
scheduling deferred data transmission onto another carrier via new Downlink Control Information (DCI) format using a PDCCH.

12. The method according to claim 1, wherein the User Equipment (UE) indicates via a Physical Uplink Control Channel (PUCCH) whether the User Equipment (UE) is transmitting on the licensed frequency band.

13. The method according to claim 1, further comprising:
marking a component carrier as heavily occupied when recurrent transmission deferring indications have been generated; and
scheduling a non-heavily occupied component carrier for the data transmission.

14. The method according to claim 1, further comprising:
gathering information regarding the unlicensed frequency bands, comprising used and available resources on the bands, in the base station (eNB).

15. An apparatus, which is one of a User Equipment or a base station eNB), comprising:
circuitry configured to:
establish a connection between the User Equipment (UE) and the base station (eNB) utilizing licensed and unlicensed frequency bands;
generate and send either in downlink or uplink direction a transmission deferring indication regarding a first component carrier locating on an unlicensed band, when interference is detected on the first component carrier; and
deactivate data transmission on the first component carrier for a predetermined number of subframes without terminating the allocation of the first component carrier, according to the transmission deferring indication for deferring the data transmission on the first component carrier.

16. The apparatus according to claim 15, wherein the circuitry is configured to send the transmission deferring indication on a primary component carrier (PCC) on the licensed frequency band while the first component carrier is a secondary component carrier (SCC).

17. The apparatus according to claim 15, wherein the transmission deferring indication covers the uplink data transmission by the User Equipment (UE).

18. The apparatus according to claim 15, wherein the transmission deferring indication covers all resources on the unlicensed spectrum or resources on the first component carrier only.

19. The apparatus according to claim 15, wherein the circuitry is configured to transmit the deferred data either on a second component carrier or on the first component carrier, depending on the occupying condition of resources on the first component carrier.

20. The apparatus according to claim 15, wherein the apparatus is the base station (eNB), and further, the circuitry is configured to send the transmission deferring indication via a Physical Downlink Control Channel (PDCCH).

21. The apparatus according to claim 15, wherein the apparatus is the User Equipment (UE), and further, the circuitry is configured to send the transmission deferring indication via a physical uplink shared channel (PUSCH) of a primary component carrier using a licensed frequency band.

22. A non-transitory computer readable medium storing a computer program comprising code adapted to perform the following steps, when executed on a data-processing system, comprising:
establishing a connection between a User Equipment (UE) and a base station (eNB) utilizing licensed and unlicensed frequency bands;
generating a transmission deferring indication regarding an allocated first component carrier located on an unlicensed band, when interference is detected on the first component carrier; and
deactivating data transmission on the first component carrier for a predetermined number of subframes without terminating the allocation of the first component carrier according to the transmission deferring indication for deferring the data transmission on the first component carrier.

* * * * *